United States Patent [19]
Kuhlman

[11] Patent Number: 5,182,860
[45] Date of Patent: Feb. 2, 1993

[54] SKIMMER

[76] Inventor: Delmar A. Kuhlman, P.O. Box 3158, Wichita, Kans. 67201-3158

[21] Appl. No.: 754,060

[22] Filed: Sep. 3, 1991

[51] Int. Cl.⁵ .............................................. A47J 43/28
[52] U.S. Cl. ......................................... 30/325; 30/324
[58] Field of Search ........................ 30/141, 147–150, 30/324–328; D7/653; 99/316, 499

[56] References Cited

U.S. PATENT DOCUMENTS

| 4,825,551 | 5/1989 | Sherblom | 30/325 X |
| 4,839,965 | 6/1989 | Levie | 30/324 |
| 5,005,294 | 4/1991 | Roberts et al. | 30/324 |

Primary Examiner—Douglas D. Watts
Attorney, Agent, or Firm—John Wade Carpenter

[57] ABSTRACT

A skimmer for removing fat from a liquid comprising a bowl, and a handle member releasably engaging the bowl. The bowl has a structure defining an opening in the bottom of the bowl. A bowl member is secured to the bottom of the bowl in proximity to the opening. The handle member comprises a generally hollow handle neck having a structure defining a handle bore and a longitudinal slot communicating with the handle bore. A plunger is slidably disposed in the handle bore, and a trigger member is secured to the plunger and protrudes through the longitudinal slot. A spring is disposed in the handle bore and engages the plunger for biasing the plunger.

20 Claims, 6 Drawing Sheets

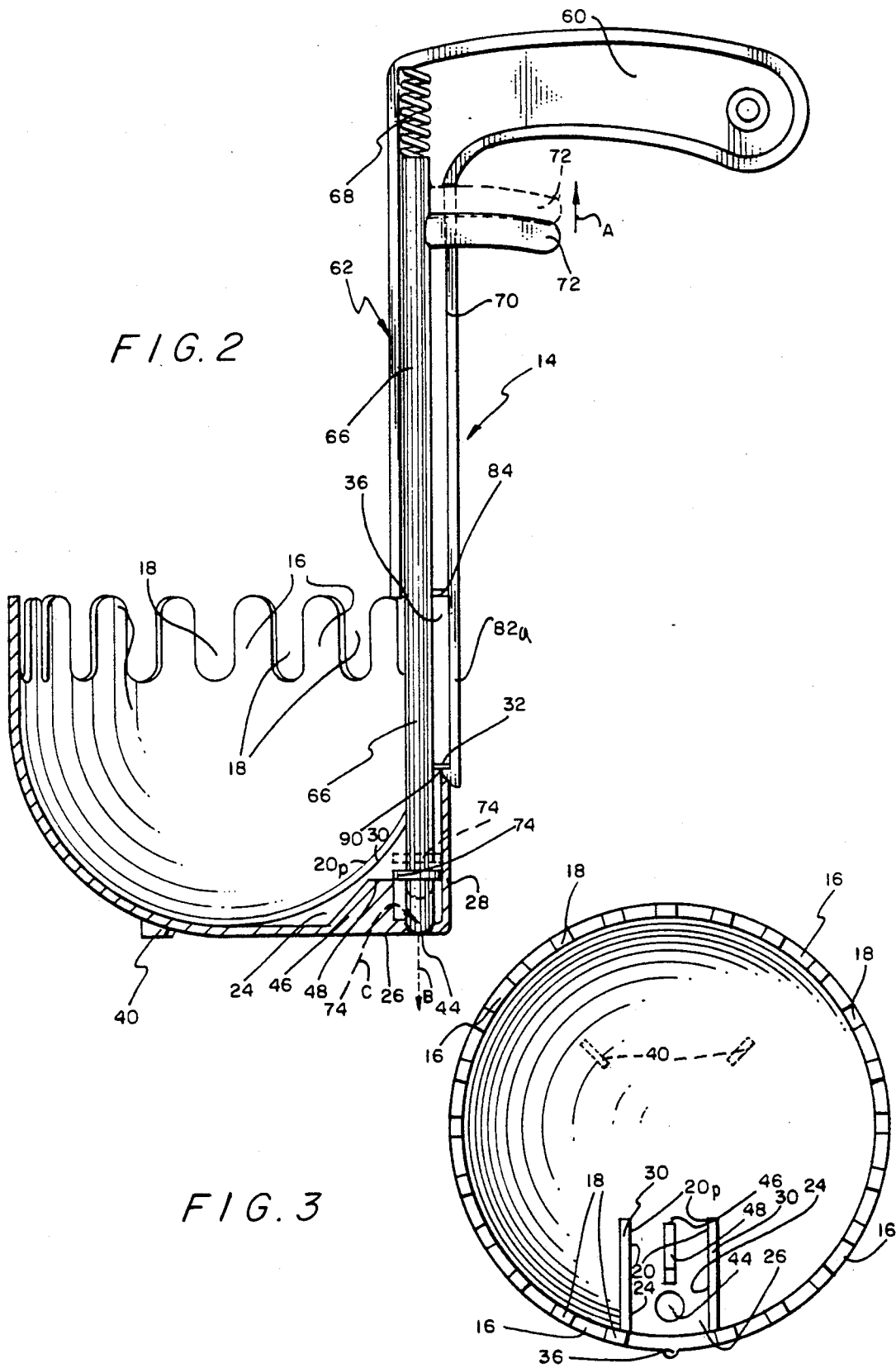

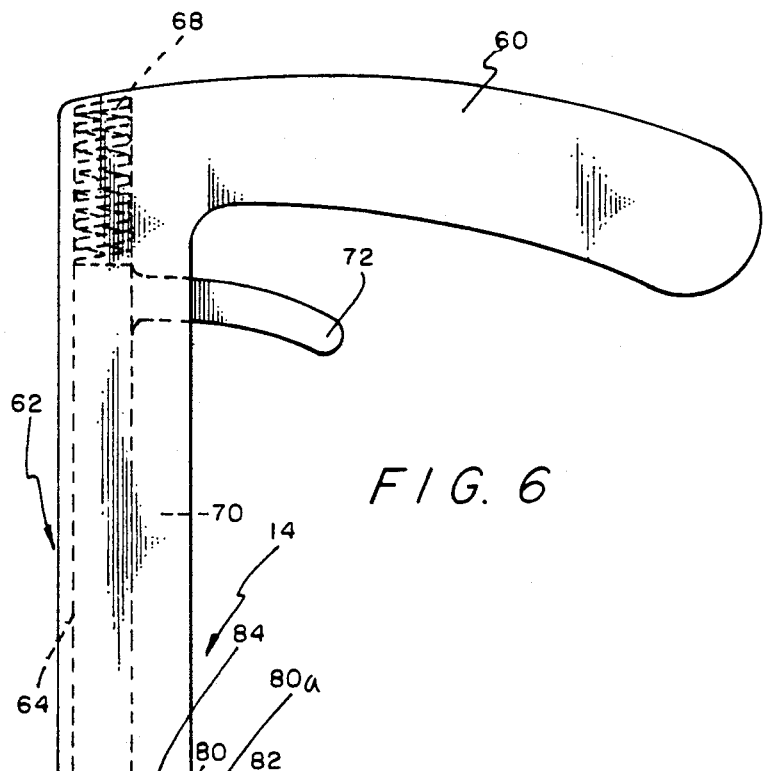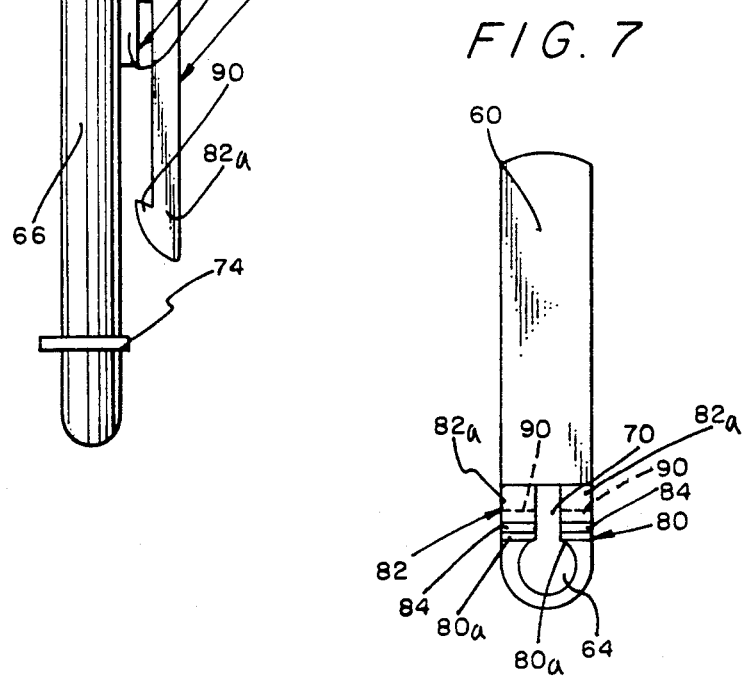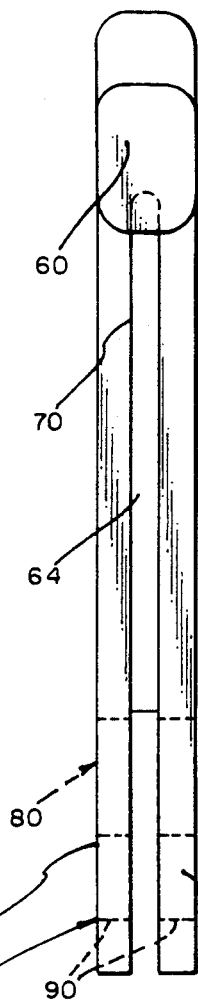

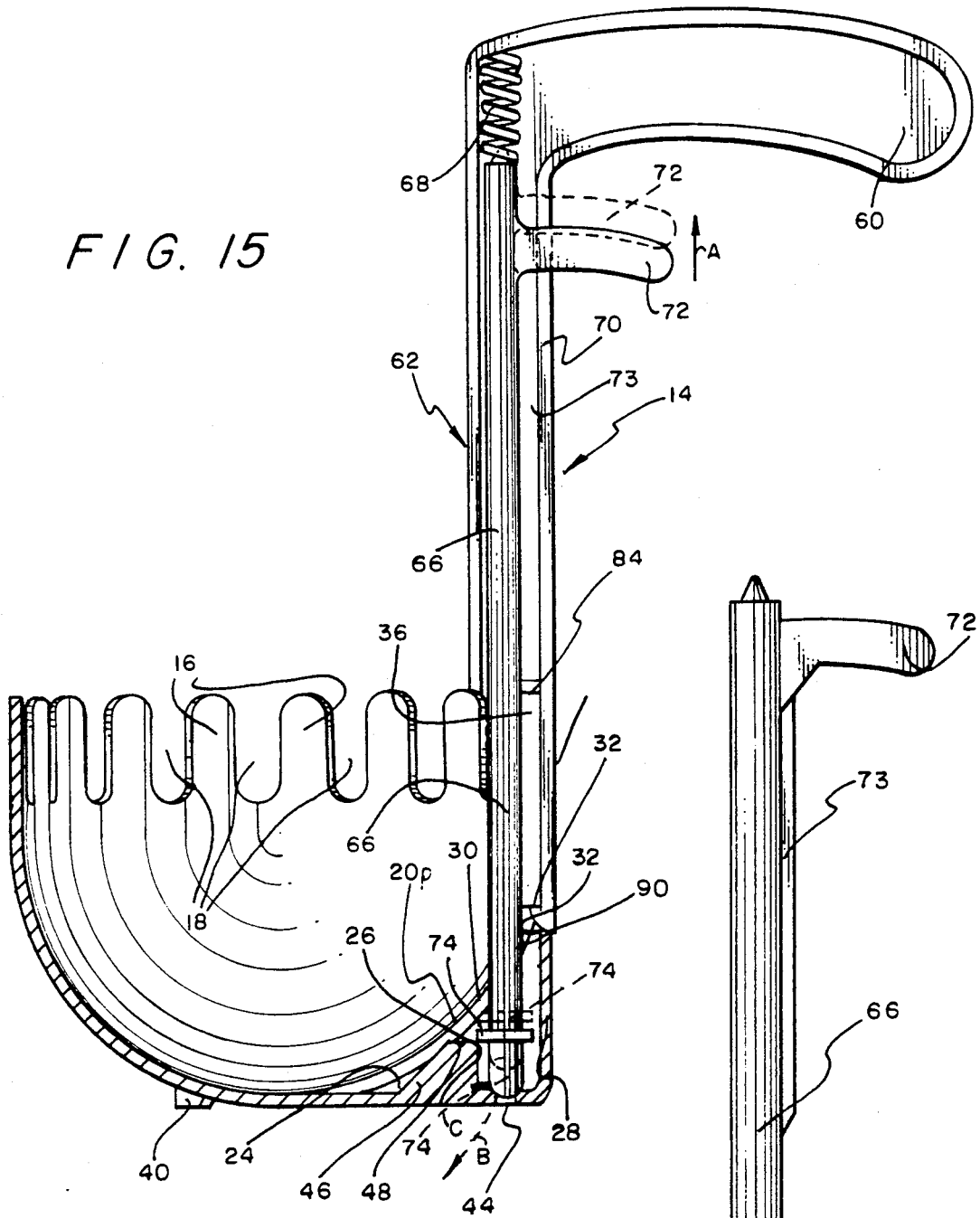
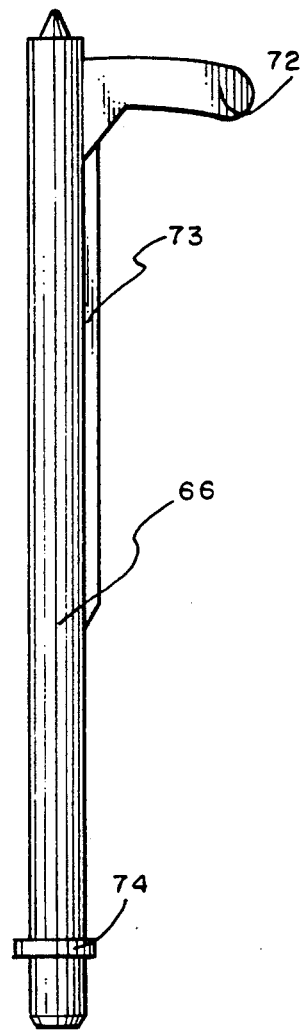
FIG. 15
FIG. 14

SKIMMER

1. FIELD OF THE INVENTION

The present invention relates to a skimmer. More specifically, the present invention provides for a skimmer useful for skimming fat from gravy, broth, or any other liquid.

2. DESCRIPTION OF THE PRIOR ART

A patentability investigation was conducted and to the following U.S. Pat. by Nos. were discovered: 1,240,360 to Palmer; 1,253,612 to Love; 1,334,169 to Royer; 1,570,321 to Sweeney; 2,143,782 to Lewy; 2,522,343 to Cansfield; 2,572,524 to Schmeiler; 4,839,965 to Levie; and Des. 194,402 to Schlessel. None of the foregoing prior art U.S. Patents teach or suggest the particular skimmer of this invention.

SUMMARY OF THE INVENTION

The present invention accomplishes its desired objects by providing a skimmer for removing fat from a liquid comprising a bowl, and a handle member releasably engaging the bowl. The bowl comprises a, structure defining an opening in the bottom of the bowl, and a fat engaging member secured to the bottom of the bowl in proximity to the opening. The handle member comprises a generally hollow handle neck having a structure defining a handle bore and a longitudinal slot communicating with the handle bore. A plunger is slidably disposed in the handle bore, and a trigger member is secured to the plunger and protruding through the longitudinal slot. A spring means is disposed in the handle bore and engaging the plunger for biasing the plunger.

The present invention further accomplishes its desired objects by broadly providing a skimmer for removing fat from a liquid comprising a bowl; and a handle member releasably engaging the bowl. The bowl comprises a structure defining an opening in the bottom of the bowl. A generally hollow container member is secured to the outside of the bowl to cover the opening such that the inside of the container member communicates with the inside of the bowl. The container member has a structure defining a container aperture; and the handle member comprises a generally hollow handle neck having a structure defining a handle bore and a longitudinal slot communicating with the handle bore. A plunger is slidably disposed in the handle bore, and a trigger member is secured to the plunger and protrudes through the longitudinal slot. A spring means is disposed in the handle bore and engages the plunger for biasing the plunger.

It is therefore an object of the present invention to provide a skimmer.

These, together with the various ancillary objects and features which will become apparent to those skilled in the art as the following description proceeds, are attained by this novel skimmer, a preferred embodiment as shown with reference to the accompanying drawings, by way of example only, wherein;

BRIEF DESCRIPTION OF THE DRAWINGS

FIG. 2 is a side elevational view of the skimmer;
FIG. 3 is a top plan view of the bowl;
FIG. 6 is a side elevational view of the handle;
FIG. 7 is an end view of one end of the handle with the plunger removed;
FIG. 8 is an end view of another end of the handle with the plunger removed;
FIG. 9 is a rear elevational view of the handle with the plunger removed;
FIG. 14 is a side elevational view of the reinforced trigger;
and
FIG. 15 is a partial cut-away view illustrating the reinforced trigger releasably secured to the bowl.

DETAILED DESCRIPTION OF A PREFERRED EMBODIMENT OF THE INVENTION

Figure 1:
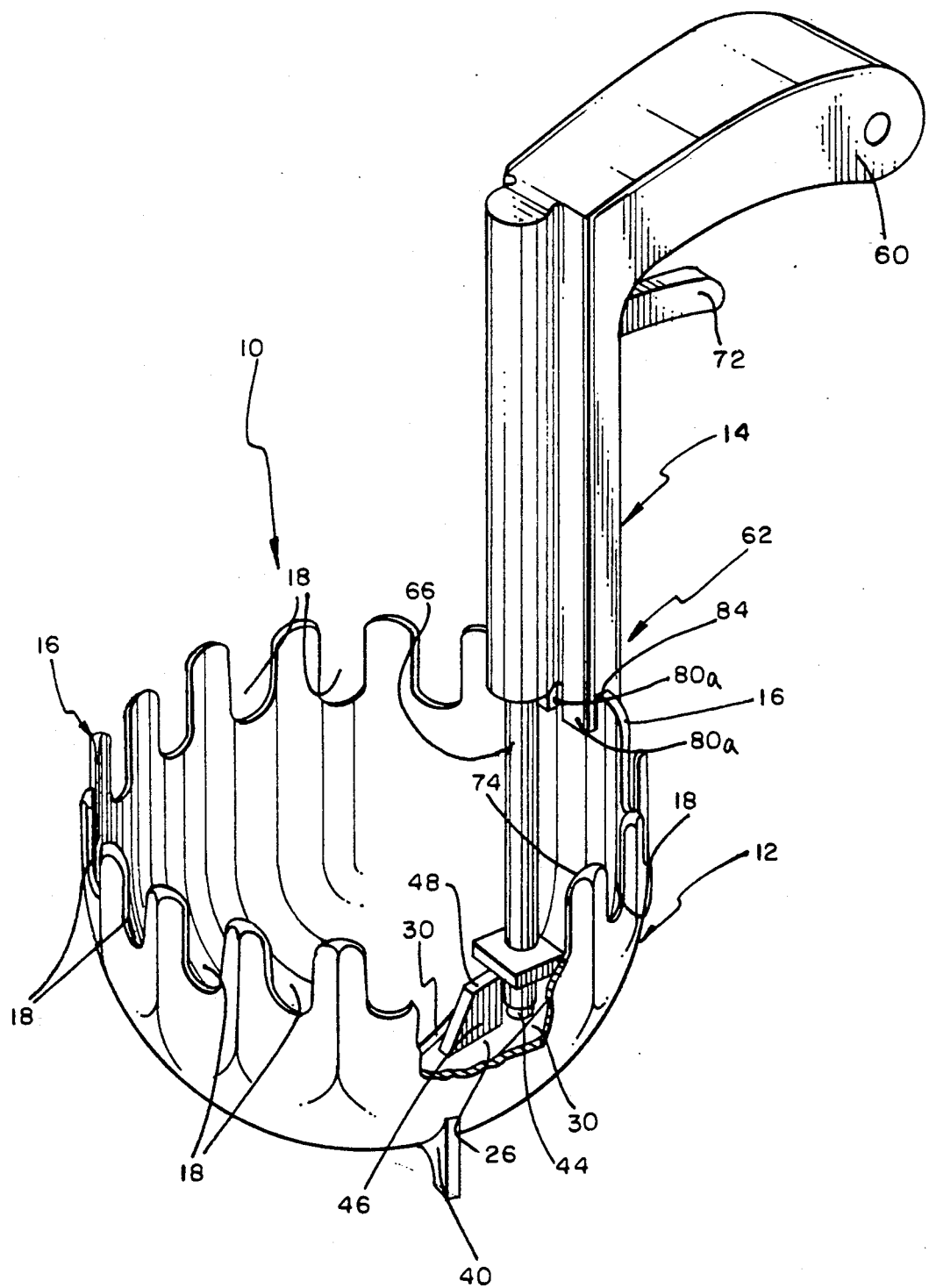
FIG. 1 is a perspective view of the skimmer.

Referring in detail now to the drawings wherein similar parts of the invention are identified by like reference numerals, there is seen a skimmer, generally illustrated as 10, comprising a cup or bowl, generally illustrated as 12, and a handle member, generally illustrated as 14, releasably engaging the bowl 12.

Figure 4:
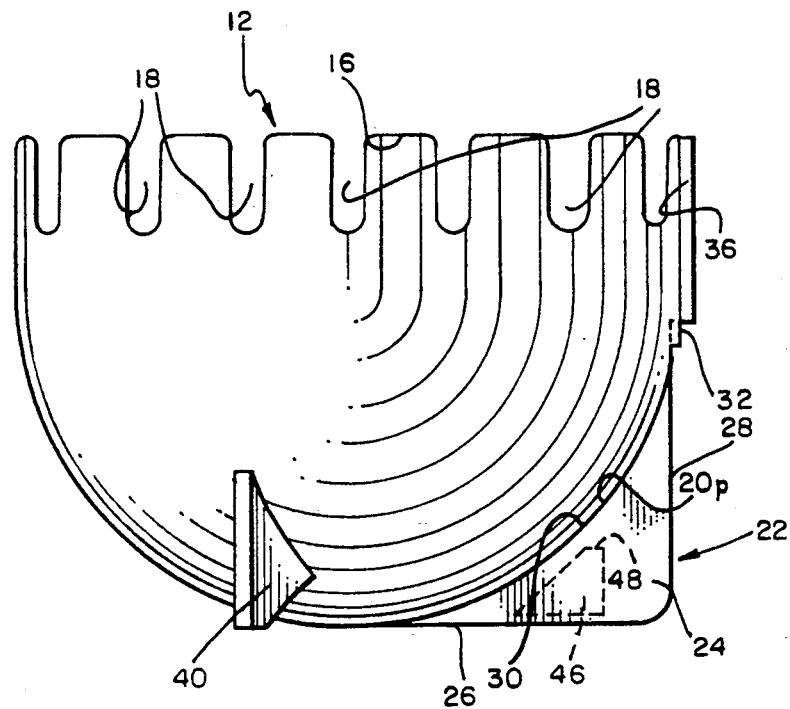
FIG. 4 is a side elevational view of the bowl.
Figure 5:
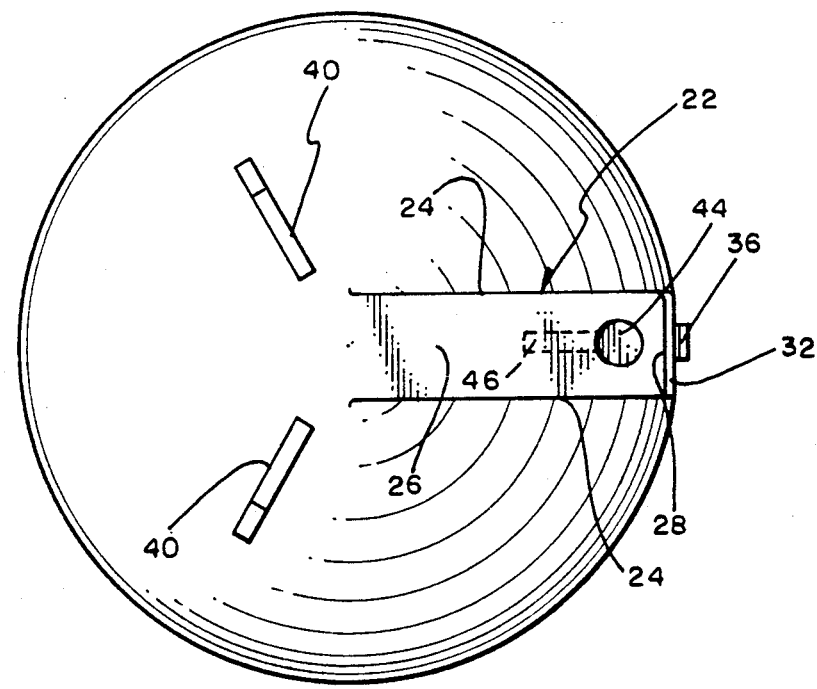
FIG. 5 is a bottom plan view of the bowl.
Figure 10:
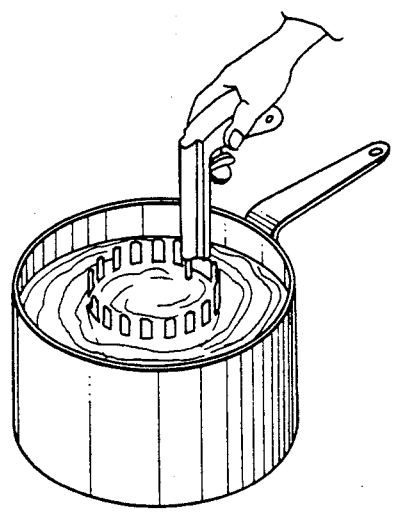
FIG. 10 is a perspective view showing the bowl submerged in a liquid having fat to be skimmed.

The bowl 12 has a perimeter 16 which is interrupted by a plurality of recesses 18 to produce a saw-tooth like perimeter. Stated alternatively, the perimeter 16 has a structure defining a plurality of recesses 18 wherethrough fat and liquid (e.g. broth, etc.) flows when the bowl 12 is submerged into any liquid having fat to be removed. When the bowl 12 is submerged, it is preferably submerged with the bottom of the bowl 12 entering the liquid first and with the perimeter 16 generally horizontal and/or parallel with the top of the liquid as best shown in FIG. 10. The recesses 18 function as filtering canals wherethrough the surface of the liquid, including fat, skims and passes into the bowl 12. The bowl 12 also has a generally arcuate opening 20 in a side of the bowl 12. A container, generally illustrated as 22, integrally secures to the bottom of the bowl 12 to cover the arcuate opening 20. More specifically, the container 22 has a pair of opposed container sides 24—24 generally parallel to each other and secured to a container bottom 26. A container back 28 is conveniently formed integrally with the pair of container sides 24—24 and the container bottom 26 such that the entire container 22 connects integrally to the outside of the bowl 12 and covers the arcuate opening 20 and the inside of the bowl 12 can communicate with the inside of the container 22. As best shown in FIGS. 1, 2 and 4, the container sides 24—24 each have an arcuate upper surface 30 integrally connecting to opposed borders or opposed perimeters 20p—20p of the arcuate opening 20 to enable the inside of the bowl 12 to communicate with in the inside of the container 22 and to cover the arcuate opening 20 of the bowl 12. The container back 28 connects to the back of the bowl 12 such that a lip or recess 32 is formed in back of the bowl 12. The recess or lip 32 receives a structural portion of the handle 14 as will be further explained below. The bowl 12 additionally comprises a guide ridge 36 secured to the back of the bowl 12 such as to expand from the perimeter 16 downwardly to terminate at the recess or lip 32. The guide ridge 36 as will be further explained below assists in maintaining the handle 14 in a generally upright, normal position with respect to a perimeter 16 or a horizontal plane (not shown) across the perimeter 16. A pair of feet 40—40 connect to the outside bottom of the bowl 12 as best shown in FIGS. 1, 4 and 5. The pair of feet 40—40 in combination with the container bottom 26 enable the bowl 12 to be placed on a horizontal surface and be maintained in an upright position. More specifically, a plane across the bottom of the feet 40—40 and the container bottom 26 is generally a horizontal plane when the bowl 12 is postured on a horizontal surface, such as the surface of a table or the like. The container bottom 26 has an opening 44 wherethrough the liquid (i.e. broth and the like) will pass while any skimmed fat will remain on the inside of the bowl 12 to be washed. A trapezoidal shaped member 46 (i.e. a fat engaging member) is formed on the container bottom 26. The member 46 has an upper surface 48 where against a structural portion of the handle 14 contacts or rests. The trapezoidal shaped member 46 partly functions as filter to keep fat from flowing through aperture 44. Fat has a tendency to coagulate and fat contacting the member 46 will have a tendency to engage and adhere to member 46 without breaking up or by-passing the member 46 and flow through opening 44.

The handle 14 comprises a handle head 60 and a handle neck 62 secured to the handle head 60. The handle neck 62 has a longitudinal bore 64 wherein a plunger 66 slidably lodges. A spring biasing member 68 lodges at an end of the bore 64 for biasing the plunger away or downwardly. The handle 14 also has a longitudinal opening 70 communicating with the bore 64. A trigger member 72 (i.e. a means for elevating the plunger 66) is formed with or is bound to the plunger 66 and extends through the longitudinal opening such as to be capable of sliding back and forth therein. The trigger member 72 is preferably a reinforced trigger member 72 having a rib 73 which is secured to the plunger 66 and slidably lodging in the longitudinal opening 70 to prevent the opening 70 from collapsing or being squeezed together (see FIGS. 14 and 15). More specifically, because the structure of the handle 14 may typically be manufactured from fragile material (such as polyethylene, etc.) that may crack or split especially at seams, if rib 73 was not slidably lodged in longitudinal opening 70, the unobstructed longitudinal opening 70 could cause the walls or seams of the handle 14 to crack or split from being squeezed. Pressure (i.e. collapsing pressure on the walls of the handle 14) could cause the structural edges of the handle defining the longitudinal opening 70 to come together and destroy any defined opening in the longitudinal opening 70. A generally square fat retention member 74 is formed with or is bound to the plunger 66 and customarily rests on surface 48 of the trapezoidal member 46. When the trigger member 72 is pulled upwardly in direction of the arrow A and to the dotted line position in FIG. 2, fat retention member 74 is elevated off of the surface 48 to the dotted line position in FIG. 2, and liquid (without fat) flows in direction of the dotted line arrows B and C in FIG. 2, and out of the bowl 12 through aperture 44. The fat retention member 74 prevents coagulated fat from flowing through the aperture 44, especially fat on top of a liquid above the fat retention member 74. Thus, the trapezoidal shaped member 46 and the squared shaped fat retention member 74, both function for retaining fat in the bowl 12 and preventing the same from flowing through aperture 44 and out of the bowl 12.

The handle 14 additionally comprises a pair of two bifurcated members generally illustrated as 80 and 82. Bifurcated members 80 comprise a pair of spaced members 80a—80a spaced or separated by the opening 70. The bifurcated members 82 comprise a pair of spaced members 82a—82a which are also spaced or separated by the opening 70. Bifurcated members 80 and bifurcated members 82 are separated by a pair of recesses 84—84 (see FIGS. 6 and 4) wherein a portion of the perimeter 16 releasably lodges when the handle 14 is slidably, releasably mounted to the bowl 12. Stated alternatively, when the handle 14 rests on the bowl 12, a portion of the perimeter 16 is contact with the recesses 84—84 and the same portion of the perimeter 16 is sandwiched between the pair of two bifurcated members 80 and 82. Bifurcated members 82 have a lug or ear or notch 90 formed at the end of each of the members 82a—82a. As best shown in FIGS. 2 and 6 the notches 90—90 face inwardly towards bifurcated members 80 and function to releasably lodge in the lip or recess 32 formed in the back of the bowl 12. Bifurcated members 82 would typically be manufactured of or from a flexible material (such as plastic or the like) and may be easily bent away from the bowl 12 to release the handle 14 off of the bowl 12. In attaching the handle 14 to the bowl 12, the bifurcated members 80 are disposed on an inside surface of the bowl 12 in close proximity 16, and a back portion of the perimeter 16 is placed in recesses 84—84, with the bifurcated members 82 being separated by the guide ridge 36 as they are placed against the back portion of the bowl 12. When the handle 14 is firmly pushed down, the notches 90 of each of the members 82a and 82a snap into the lip or recess 32 formed on the back of the bowl 12 and the guide ridge 36 is between the two members 82a—82a. As previously indicated, to remove the handle 14, the two members 82a—82a are moved away from the back of the bowl 12, causing the notches 90—90 to disengage from the lip or recess 32. After the notches 90—90 disengage, the handle 14 may be pulled upwardly to remove the back portion of the perimeter 16 from within recesses 84—84 and separate the handle 14 from the bowl 12. The bowl 12 may be made of any suitable material, but is preferably manufactured of a transparent material sold under the trademark LEXAN®. The LEXAN® trademark is a trademark for thermoplastic carbonate-linked polymers produced by reacting bisphenol A and phosgene.

Figure 11:
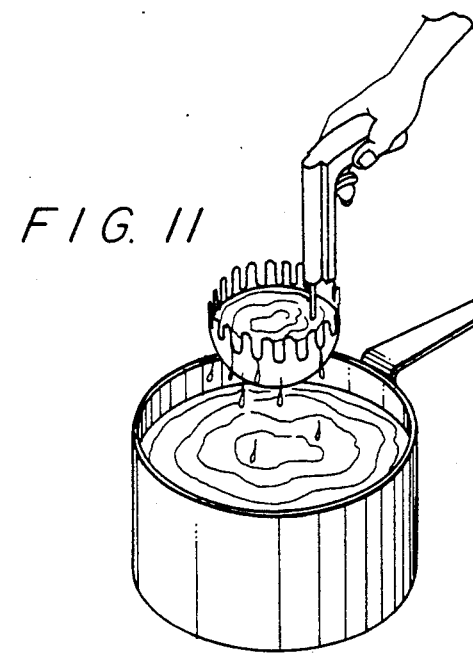
FIG. 11 is a perspective view showing the bowl removed and containing liquid with fat to be removed.
Figure 12:
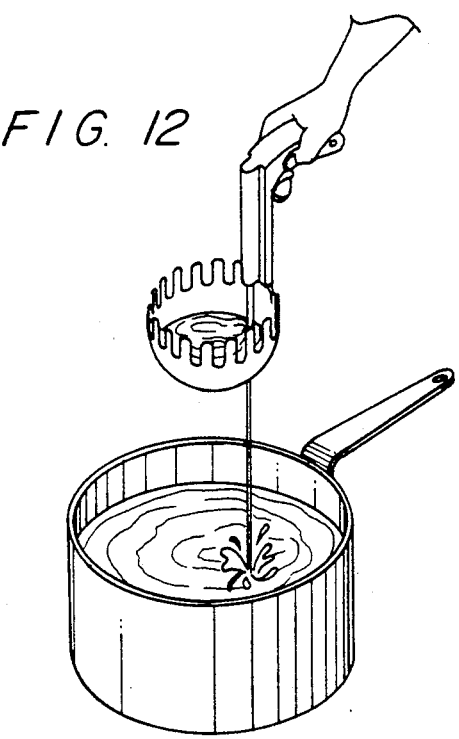
FIG. 12 is a perspective view showing the trigger pulled and liquid flowing back into a pot.
Figure 13:
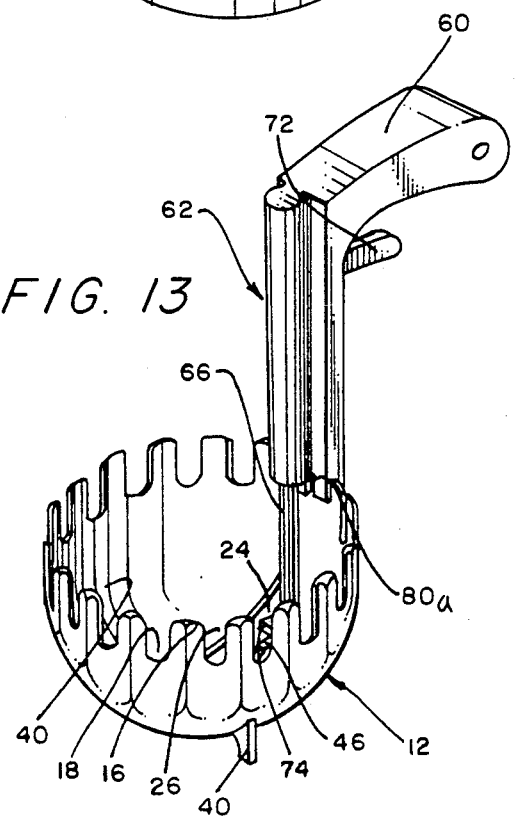
FIG. 13 is a perspective view of the skimmer.

With continuing reference to the drawings, in particular to FIGS. 10-12, for the operation for removing fat from a liquid, the bowl 12 of the skimmer 10 is slowly submerged into a liquid containing fat until the top surface of the liquid (including fat) starts flowing through the recesses 18 which act as filter canals. After the bowl 12 is full, the skimmer 10 is retrieved from the remaining liquid not in the bowl 12, and held above the remaining liquid until the fat in the liquid contained in the bowl 12 separates from the liquid and collects at the top of the bowl 12 (see FIG. 11). After the fat in the liquid contained in the bowl 12 has risen to the top of liquid, the trigger member 72 is pulled upwardly towards the handle head 60 and only pure liquid flows in direction of the dotted line arrows B and C in FIG. 2 and out of the bowl 12 through aperture 44 (see FIG. 12). Aperture 44 is open because plunger 66 has been pulled upwardly to the dotted position in FIG. 2. After all of the liquid has left the bowl 12, the trigger has left the bowl 12, the trigger member 72 is released from its elevated position causing the aperture 44 to be closed off by the plunger 66 from the spring biasing action of spring 68 on the plunger 66. As previously indicated, the trapezoidal member 46 secured to the container bottom 26 of and fat retention member 74 mounted on the plunger 66 act and cooperate with each other to filter the fat and to prevent same from flowing through aperture 44. The residual fat on the inside of the bowl 12 after the liquid has flowed from the bowl 12 may be washed away and the process may be repeated again and as many times as necessary to remove essentially all of the fat from the liquid.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A skimmer for removing fat from a liquid comprising a bowl, having a bottom and a handle member releasably engaging said bowl, said bowl comprising a structure defining an opening in the bottom of the bowl, and a fat engaging member secured to the bottom of the bowl in proximity to said opening; and said handle member comprising a generally hollow handle neck having a structure defining a handle bore and a longitudinal slot communicating with said handle bore, a plunger slidably disposed in said handle bore, a trigger member secured to said plunger and protruding through said longitudinal slot, and spring means disposed in said handle bore and engaging said plunger for biasing the plunger.

2. A skimmer for removing fat from a liquid comprising a bowl having a bottom; and a handle member releasably engaging said bowl, said bowl comprising a structure defining an opening in the bottom of the bowl; a generally hollow container member secured to the outside of said bowl to cover said opening such that the inside of said container member communicates with the inside of said bowl, said container member having a structure defining a container aperture; and said handle member comprises a generally hollow handle neck having a structure defining a handle bore and a longitudinal slot communicating with said handle bore, a plunger slidably disposed in said handle bore, a trigger member secured to said plunger and protruding through said longitudinal slot, and spring means disposed in said handle bore and engaging said plunger for biasing the plunger.

3. The skimmer of claim 1 wherein said bowl has a perimeter including a structure defining a plurality of perimeter recesses.

4. The skimmer of claim 2 wherein said bowl has a perimeter including a structure defining a plurality of perimeter recesses.

5. The skimmer of claim 1 wherein said bowl additionally comprises a lip for receiving a structural portion of the handle.

6. The skimmer of claim 2 wherein said bowl additionally comprises a lip for receiving a structural portion of the handle.

7. The skimmer of claim 1 additionally comprising a guide ridge secured to the outside of said bowl.

8. The skimmer of claim 2 additionally comprising a guide ridge secured to the outside of said bowl.

9. The skimmer of claim 1 additionally comprising a fat retention member secured to said plunger.

10. The skimmer of claim 2 additionally comprising a fat retention member secured to said plunger.

11. The skimmer of claim 2 additionally comprising a fat retention member secured to a bottom of the hollow container member in proximity to said container aperture.

12. The skimmer of claim 1 wherein said handle member comprises at least one pair of bifurcated members.

13. The skimmer of claim 2 wherein said handle member comprises at least one pair of bifurcated members.

14. The skimmer of claim 1 wherein said handle member comprises a pair of bifurcated members with each member having a structure defining a notch.

15. The skimmer of claim 2 wherein said handle member comprises a pair of bifurcated members with each member having a structure defining a notch.

16. The skimmer of claim 1 wherein said plunger additionally comprises a rib member slidably lodging in said longitudinal slot.

17. The skimmer of claim 2 wherein said plunger additionally comprises a rib member slidably lodging in said longitudinal slot.

18. A skimmer for removing fat from a liquid comprising a bowl having a bottom, said bowl having a structure defining an opening in the bottom of the bowl; a handle member releasably engaging said bowl an decomposing a hollow handle neck having a structure defining a handle bore; a plunger slidably disposed in said handle bore such as to normally cover said opening; and a means, engaged to said plunger, for elevating the plunger such as to uncover said opening.

19. The skimmer of claim 18 additionally comprising a biasing means disposed in said handle bore and engaging said plunger for biasing the plunger; and said means for elevating the plunger comprises a trigger member secured to said plunger.

20. The skimmer of claim 18 wherein said hollow handle neck additionally has a structure defining a longitudinal slot communicating with said handle bore; and said plunger has a rid member secured thereto and slidably lodging in said longitudinal slot.

* * * * *